FIG. 1.

INVENTORS
J.D. HUGHSON
AND C.F. STAFFORD
BY
Forest B. Hitchcock
THEIR ATTORNEY

FIG. 2.

INVENTORS
J.D. HUGHSON
AND C.F. STAFFORD
BY Forest B. Hitchcock
THEIR ATTORNEY

Sept. 4, 1956  J D. HUGHSON ET AL  2,761,961
INTERMITTENT INDUCTIVE SPEED CONTROL SYSTEM FOR RAILROADS
Filed Oct. 30, 1952  6 Sheets—Sheet 3

FIG. 3. INDUCTOR WINDING OPEN CIRCUITED

FIG. 4.
INDUCTOR WINDING ENERGIZED WITH HIGH CURRENT LEVEL FOR "AIDING" FIELD

FIG. 5.
INDUCTOR WINDING ENERGIZED WITH HIGH CURRENT LEVEL FOR "OPPOSING" FIELD

FIG. 6.
INDUCTOR WINDING ENERGIZED WITH LOW CURRENT LEVEL FOR "OPPOSING" FIELD

FIG. 7.

INVENTORS
J. D. HUGHSON
AND C. F. STAFFORD
BY Forest B. Hitchcock
THEIR ATTORNEY Sept. 4, 1956  J D. HUGHSON ET AL  2,761,961
INTERMITTENT INDUCTIVE SPEED CONTROL SYSTEM FOR RAILROADS
Filed Oct. 30, 1952  6 Sheets-Sheet 4

INVENTORS
J. D. HUGHSON
BY AND C. F. STAFFORD

Forest B. Hitchcock
THEIR ATTORNEY

Sept. 4, 1956  J D. HUGHSON ET AL  2,761,961
INTERMITTENT INDUCTIVE SPEED CONTROL SYSTEM FOR RAILROADS
Filed Oct. 30, 1952  6 Sheets-Sheet 5

*INVENTORS*
J.D. HUGHSON
BY AND C.F. STAFFORD

*Forest B. Hitchcock*
THEIR ATTORNEY

Sept. 4, 1956  J. D. HUGHSON ET AL  2,761,961
INTERMITTENT INDUCTIVE SPEED CONTROL SYSTEM FOR RAILROADS
Filed Oct. 30, 1952  6 Sheets—Sheet 6

FIG.12.

CLEAR CONTROL SEQUENCE (SUCCESSIVE)

NR ▬▬▬▬▬▬▬▬▬▬▬▬▬▬▬▬▬▬▬▬
PR ─────────────────────
CR ──▲◣───────────────
NRP ▬▬▬▬▬▬▬▬▬▬▬▬▬▬▬▬▬▬▬▬
R5 ▬▬▬▬▬▬▬▬▬▬▬▬▬▬▬▬▬▬▬▬
R3 ▬▬▬▬▬▬▬▬▬▬▬▬▬▬▬▬▬▬▬▬
ACK ── ACTUATION OF ACKNOWLEDGE CONTACTOR NOT REQUIRED
HS ─────────────────────
HSP ▬▬▬▬▬▬▬▬▬▬▬▬▬▬▬▬▬▬▬▬
LS ─────────────────────
LSP ─────────────────────
AS ─────────────────────
ASP ─────────────────────

*INVENTORS*
J.D. HUGHSON
BY AND C.F. STAFFORD

Forest B. Hitchcock
THEIR ATTORNEY

United States Patent Office 2,761,961
Patented Sept. 4, 1956

2,761,961

INTERMITTENT INDUCTIVE SPEED CONTROL SYSTEM FOR RAILROADS

J Donald Hughson, Rochester, and Chester Friend Stafford, Spencerport, N. Y., assignors to General Railway Signal Company, Rochester, N. Y.

Application October 30, 1952, Serial No. 317,664

9 Claims. (Cl. 246—63)

This invention relates to an intermittent inductive train control system, and more particularly pertains to a system wherein any one of a number of different speed limits may be imposed upon moving trains by the inductive transfer to appropriate train-carried equipment of respectively different controlling influences from fixed wayside locations.

In some prior intermittent inductive train control systems, a controlling influence is made effective on a train as it passes each wayside signal location only when traffic conditions ahead require that the signal display a restrictive indication. To avert an automatic penalty brake application in response to this controlling influence, it is required in these prior systems that the engineer acknowledge his observance of the restrictive signal by performing a prescribed manual act as he passes such signal. In this way, alertness of the engineer to the wayside signals is required. But in these systems, the engineer is not forced to heed the restrictive signal indication after acknowledging it since he may operate the train at any speed he chooses.

In these prior systems, it has not been feasible to impose a control with a corresponding speed limit upon a train as it passes a signal location and have this control remain steadily effective until the train reaches the next wayside signal location. The reason is that such a system requires more than one kind of control from a wayside signal location so that a previously imposed restrictive control can be removed when traffic conditions warrant at some subsequent signal location; and such a plurality of controls from a fixed wayside location to passing trains has not been available in a safe and reliable organization.

It is proposed according to this invention to provide an intermittent inductive train control system in which as many as four different controls are inductively transferred or transmitted to appropriate apparatus on passing trains from each wayside location so that restrictive controls are selectively applied and removed as required. In this way, a particular speed limit is imposed with each different control; and, through the cooperation of speed governing equipment on the train, the system is so organized as to cause the brakes to be automatically applied whenever the then effective speed limit is violated. Thus, the system may actually be termed an intermittent inductive speed control system.

Described briefly, the train control system of this invention comprises both wayside apparatus and train-carried apparatus with the various controls transferred inductively from each wayside signal location to passing vehicles. The wayside apparatus includes an inductor having a control winding which may be selectively open circuited or energized with direct current of different polarities and amplitudes dependent upon the kind of control that is to be effective upon the train.

The train-carried apparatus comprises two receivers which sequentially move through an inductive coupling relationship with the wayside inductor during train movement. Each of the receivers, which are designated for convenience as receivers A and B, has a U-shaped structure with a winding about each leg thereof. As these receivers in succession pass a wayside inductor, their magnetic circuits are differently affected according to the control of the winding for that inductor, i. e., whether the control winding is open circuited or energized with direct current of high or low level or of one polarity or the other. The effects produced in the magnetic circuits of these receivers comprise distinctive variations in their magnetic flux which result in correspondingly distinctive current changes in the windings associated with these receivers so as to control associated electromagnetic relays to various conditions and thus make effective the different speed controls. Since the winding of each wayside inductor is controlled according to the indication given by the associated wayside signal, the speed limit made effective on trains passing that inductor is in accordance with the wayside signal indication at that location.

In general, the circuit means associated particularly with receiver A is effective to receive the various restrictive controls. The receiver B and its associated circuit means are, on the other hand, effective to receive a clearing or high speed control.

Both the receivers A and B are provided with a winding about each leg of their core structure. On the receiver A, one of these windings, which is designated a primary winding, is energized with direct current so as to magnetize the receiver core. Consequently, when this receiver A passes through an inductive coupling relationship with a wayside inductor, there is a distinctive flux change that takes place in the core structure of this receiver even when the control winding of the wayside inductor is open-circuited so that its core is not magnetized. Such a distinctive flux change takes place as a result of the effect of the iron of the wayside inductor on the reluctance of the magnetic circuit for the receiver A. The distinctive flux change that takes place under this condition causes a distinctive voltage to be induced in the secondary winding of the receiver A, and this voltage results in selective actuation of relay means directly associated with this secondary winding and so is effective to impose a particular restrictive control on the train.

Neither of the windings on the receiver B is energized with direct current so that the core structure of this receiver is normally not magnetized. Therefore, no flux change takes place when this receiver B passes through an inductive coupling relationship with a wayside inductor that has its control winding open-circuited for transmitting one kind of restrictive control. Thus, the restrictive control transferred to the train-carried equipment through the receiver A by open-circuiting the control winding of an inductor affects only the relay means associated more particularly with receiver A and not that associated with receiver B.

Additional controls are inductively transmitted to passing trains by selective energization of the control windings of wayside inductors. The resulting magnetic field of the inductor is effective to produce distinctive flux changes through the core structure of both the receivers A and B. However, because of the presence of the primary winding on receiver A and its associated low impedance circuit which are effective to magnetize the core of receiver A, a relatively high amplitude of magnetization of the wayside inductor is required to produce a flux change in the core of this receiver A of an effective magnitude. Low level magnetization of the wayside inductor produces only rather insignificant flux variations in the core of receiver A which do not, in general, produce induced voltages of sufficient magnitude to operate the relay means directly controllable by its secondary winding.

The receiver B is not limited in this way, however, because it does not have a primary winding with an accompanying low impedance circuit; the two windings of this receiver are preferably connected in series-aiding fashion with the voltage induced in these windings being used to control associated relay means. Even a relatively low level magnetization of the wayside inductor produces a sufficient flux change in the core of receiver B to produce operation of the relay means associated with this receiver. Low level energization of the control winding of a wayside inductor with a particular polarity of direct current is, therefore, utilized for transmitting clearing controls to passing trains because under this condition a restrictive control does not at the same time become effective on the train-carried equipment through receiver A which receives the restrictive controls.

The control that is inductively transmitted by a wayside inductor to passing vehicles when the control winding of the inductor is open-circuited is the most restrictive of the various controls and requires that the train move at the slowest of several established speed limits. When the control winding of the inductor is energized with direct current, a less restrictive or even a clearing control is transmitted to passing trains, dependent upon whether the control winding energization is of the high or low level and of one polarity or the other. In this way, the system is organized on fail-safe principles. If, for example, a train is travelling at the highest permitted speed and traffic conditions ahead require that it receive a limited or approach speed control when passing the next wayside inductor, the control winding of such inductor is energized with current of the higher amplitude as will later be explained. However, if the energization of the control winding at that time is not established because of some circuit failure, the control winding becomes open-circuited and the inductor then transmits the most restrictive control to passing trains.

When the control winding of the wayside inductor is energized at the higher level of direct current for the purpose of transmitting either limited or approach speed controls to passing trains, distinctive flux changes occur in the core structures of both the receivers A and B. These flux changes induce voltages in the windings of these receivers of sufficient amplitude to produce selective actuation of the relay means controllable respectively by each of these receivers. Under this condition of wayside inductor control, it may, therefore, be considered that both a clearing and a restrictive control become effective at the same time on a passing train; the clearing control becoming effective through the influence of the inductor on receiver B, and the restrictive control becoming effective through the influence of the wayside inductor on receiver A.

Preferably the receivers A and B are so mounted on a vehicle that receiver B passes through an inductive coupling relationship with the wayside inductor before the receiver A. In this way, a clearing control first is received as receiver B passes the wayside inductor, and a moment later a restrictive control is received as the receiver A passes this same inductor. Since a clearing control is intended to become effective on the train-carried equipment only in response to an inductor having the lower level of energization because this produces substantially no effect upon receiver A, the first control which is received by receiver B is prevented by associated circuit means from actually becoming effective on the train-carried equipment as a new speed control for a prescribed length of time. Then when the restrictive control is received by receiver A, the clearing control stored in the relay means associated with receiver B is cancelled, and the restrictive control is instead then registered on the train-carried equipment and the speed limit of the train is changed accordingly.

When the trains passes a wayside inductor which is magnetized at the lower level for a clearing control, this clearing control is again received as soon as the receiver B passes the wayside inductor. Again this control is prevented for a certain time interval from actually being registered on the train-carried equipment and changing the then established control. During this time interval, no restrictive control becomes effective on the receiver A because of the low level of magnetization of the inductor effective at this time. With no restrictive control received to cancel the previously received clearing control, the clearing control becomes effective and the maximum speed limit for the train is authorized.

In an organization such as that of the present invention where the control winding of the wayside inductor is selectively open-circuited or energized with different polarities and amplitudes of current for the different controls and where a low level of energization of the control winding is effective to cause a clearing control to be transmitted to passing trains, it may happen that a circuit is completed to energize the control winding with a high level of current for a restrictive control but because of some circuit failure the control winding is in effect either short-circuited or energized with the lower current level. Energization of the control winding at the lower current level might cause a clearing control to be erroneously transmitted to passing trains. Also, it has been found that short circuiting the control winding of the inductor causes the inductor to have substantially no effect upon the magnetic circuits of the train-carried receivers. In either event, a dangerous situation would arise since the restrictive control would either not be transmitted at all to passing trains or instead a clear control would be falsely given. For this reason, the wayside apparatus according to this invention is so organized as to eliminate this unsafe condition by causing the control winding of an inductor to become open-circuited if the energization for the wayside inductor drops below a certain prescribed level at a time when the control winding should instead be energized with the higher level of current for a restrictive control.

The system of this invention is also organized to require that the engineer operate an acknowledging contactor each time his train passes a wayside inductor at a signal location when the signal is displaying any indication other than a clear indication. This requirement ensures that the engineer will maintain a high degree of alertness to the wayside signals because failure to acknowledge the restrictive signals results in automatic application of the brakes.

In addition, the apparatus is organized so that the engineer is required to operate his acknowledging contactor when his train passes a wayside inductor at the first clear signal location that is reached after the train has previously operated under restrictive controls. However, circuit means is provided so that after receiving the first clear control, successive clear controls may be properly received without requiring the engineer to operate the acknowledge contactor. Since the engineer ordinarily performs the acknowledging act only as the train passes a wayside signal location, a clearing control can become effective to remove a previously received restrictive control only during such relatively short time interval and not at other times. This arrangement, therefore, gives added protection to the system by avoiding the possibility of a train-carried receiver being affected falsely from some extraneous source to give a clearing control while the train is being operated under a restrictive control previously received.

In view of these various considerations, an object of this invention is to provide an intermittent inductive train control system in which any one of as many as four different controls can be selectively transmitted in a safe and reliable manner from a wayside inductor to the receivers of a passing train.

Another object of this invention is to provide the plurality of controls for such an intermittent inductive train control system by requiring only one wayside inductor and by selectively open-circuiting the control winding of this inductor or by energizing this control winding with different polarities and amplitudes of direct current.

An additional object of this invention is to provide an intermittent inductive train control system in which as many as four different controls may be made effective on passing trains from fixed wayside locations wherein a single inductor is used at each wayside location and the train-carried apparatus comprises two receivers so mounted as to pass sequentially through an inductive coupling relationship with each wayside inductor during train movement.

Still another object of this invention is to provide an intermittent train control system in which as many as four different controls may be selectively transmitted to a passing train from each of a plurality of wayside locations and in which the train-carried receiving apparatus acts in cooperation with a speed governor on the train so that various predetermined speed limits may be selectively imposed on the train with each such speed limit being maintained throughout the block until the next wayside signal location is reached.

Other objects, purposes, and characteristic features of this invention will in part be obvious from the accompanying drawings and in part pointed out as the description of the invention progresses.

In describing this invention in detail reference is made to the accompanying drawings in which like reference characters designate corresponding parts throughout the views, and in which.

To simplify the illustration and facilitate the explanation of this invention, the various parts and circuits are shown diagrammatically and certain conventional illustrations are used. The various relays and their contacts are illustrated in a conventional manner. The symbols (+) and (—) are used to indicate connections to the opposite terminals of a battery or other source of electric current instead of showing all of the connections to these terminals.

Figure 1:
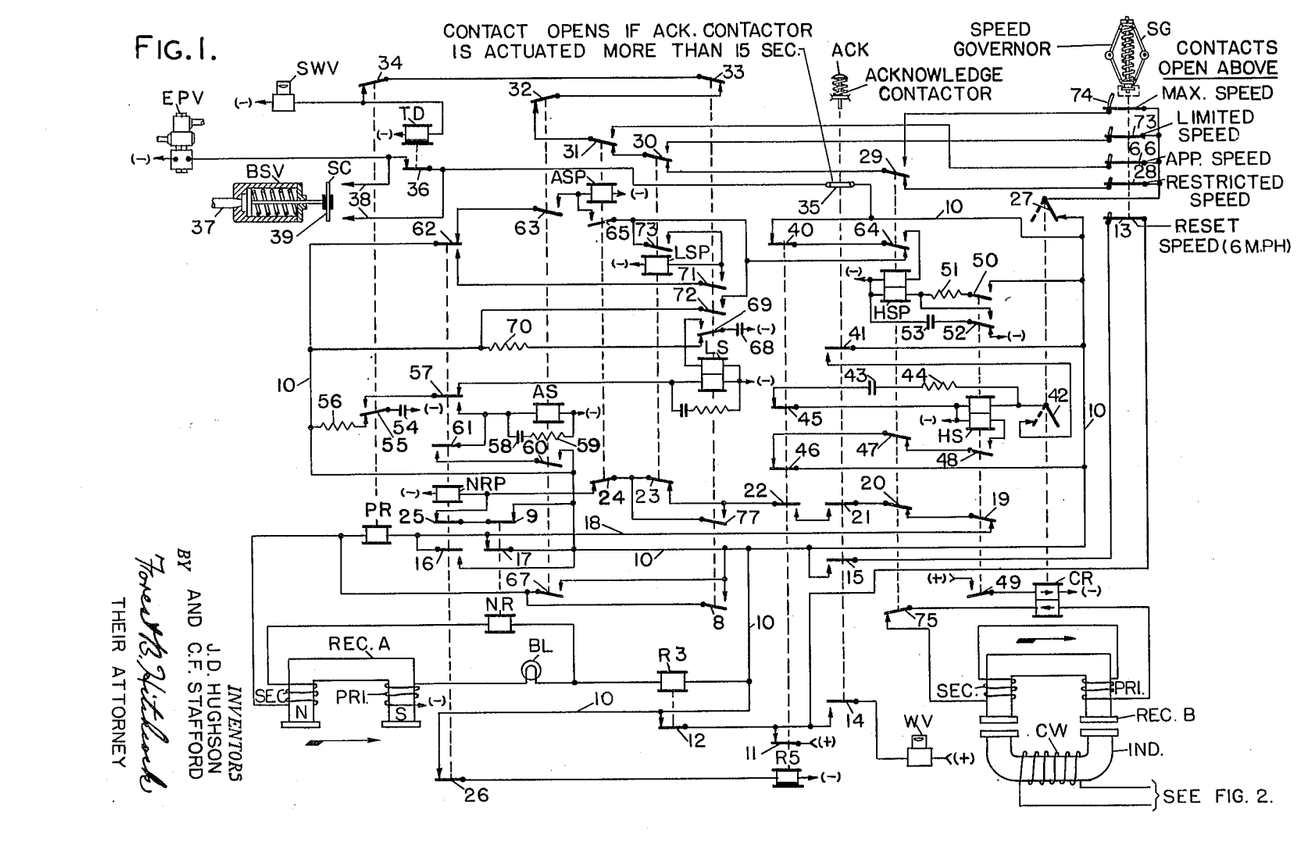
Fig. 1 is a circuit diagram illustrating in detail one embodiment of the train-carried equipment of this invention.

The detailed circuit of Fig. 1 includes, in addition to the train-carried equipment, a diagrammatic view of a wayside inductor IND. The detailed structure of a typical wayside inductor of the kind contemplated to be used in this invention may be shown in the patent to C. S. Bushnell, No. 1,706,839, dated March 26, 1929. This inductor is provided with a control winding CW as shown in Fig. 1, and this winding may be controlled by the wayside signalling system in the manner shown in Fig. 2.

Figure 2:
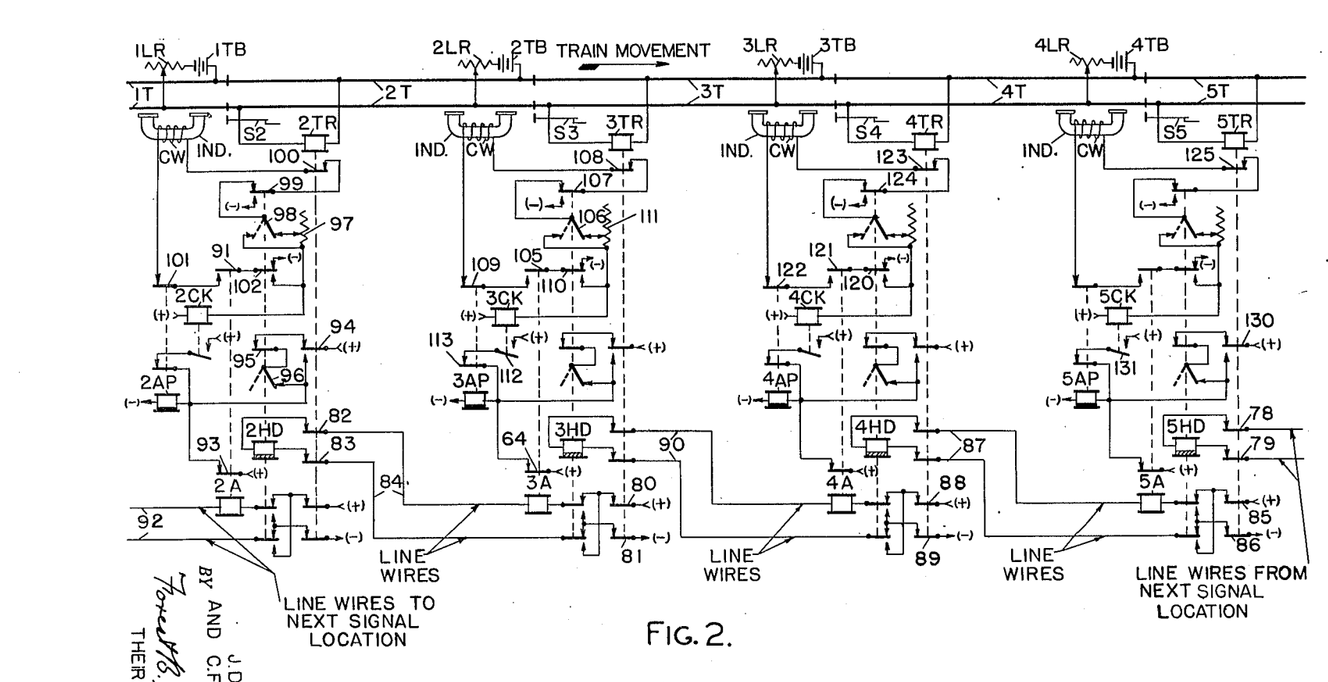
Fig. 2 diagrammatically shows one way in which the wayside inductors may be selectively controlled in a line wire block signalling system.

Briefly, the wayside circuit organization of Fig. 2 includes a stretch of track divided into a plurality of track sections such as the track section 2T each having a track relay TR connected across the rails at the entrance end, with a track battery TB connected across the rails at the exit end through a limiting resistor LR. A wayside inductor IND is shown located just ahead of the entrance to each track section.

The inductors governing the movement of trains into any track section are controlled by a home-distant relay HD such as the relay 2HD controlling the winding CW of the inductor IND at the entrance to track section 2T.

Each HD relay is of the polar-retained neutral type having both polar and neutral contacts. When the winding of this relay is energized with either polarity of direct current, the neutral front contacts are closed, whereas the polar contacts are operable to either right or left-hand positions depending on the polarity of energization applied to the winding of this relay.

The circuit organization for controlling the control winding CW of each wayside inductor includes contacts of the associated HD and TR relays, and also includes a check relay CK. An approach relay A and an approach repeater relay AP are also provided at each signal location and cooperate with the check relay CK to provide means for causing the control winding CW of the inductor to become open-circuited if the required level of energization of the winding CW is not maintained as called for by the conditions of the relays HD and TR.

Each wayside signal such as signal S3 is shown diagrammatically. The manner in which such signals are controlled to display the different indications is well-known in the art, and has not been shown in this Fig. 2.

Although the wayside circuit organization and in particular the manner of control of the control winding CW of each wayside inductor will later be described in greater detail, it may be briefly stated that the circuits associated with the control of a control winding CW cause this winding to be open-circuited when traffic conditions warrant transferring the most restrictive control to passing vehicles; energization of one particular polarity at the higher level of current is used when an approach speed control is to be inductively transferred; energization at the same higher level but with opposite polarity is used when a limited speed control is to be inductively transferred; and energization of a particular polarity and with the lower level of direct current is used when a clearing control is to be transferred.

Two train-carried receivers A and B are shown diagrammatically in Fig. 1. These receivers are so mounted upon the locomotive or tender that they pass successively through a relatively close inductive coupling relationship with the wayside inductor during train movement. Preferably, the receiver B is mounted on the locomotive ahead of the receiver A for the normal direction of movement of the train so that first the receiver B and then the receiver A become inductively coupled with each wayside inductor as the train moves along the track. As indicated in Fig. 1 by the direction of the arrows shown above the receivers, the assumed direction of motion of the receivers relative to the stationary wayside inductor is from left to right. In Fig. 1, the relative positions of the receivers and the wayside inductors are shown as those which occur at the instant when the receiver B is directly opposite the inductor.

The train-carried receiver A is provided with both a primary winding PRI and a secondary winding SEC which are magnetically coupled to each other through the core structure of the receiver. Merely by way of illustration, the secondary and primary windings are so located on the receiver with respect to the normal direction of travel that the primary winding is towards the front of the vehicle and becomes inductively coupled with the wayside inductor before the secondary winding becomes so coupled. The principles of this invention apply equally well, however, when the secondary winding rather than the primary winding, is located toward the front of the receiver. The effect produced with this latter arrangement of receiver windings will later be described.

The primary winding PRI of the receiver A is energized with direct current. The ampere-turns of the magnetization applied to the receiver A by the field of the primary winding are sufficient to establish a relatively strong magnetic field. In the embodiment of the invention shown in Fig. 1, the polarity of energization of the receiver primary was selected to cause the pole of the receiver bearing the primary winding to be a south pole so that the other leg of the receiver bearing the secondary winding becomes a north pole. This particular selection of polarity is mentioned merely for purposes of illustration; the opposite polarities may as well be used.

The receiver B is similar in structure to receiver A and also has a winding about each leg of its U-shaped iron core structure. Neither of the windings of receiver B is energized with direct current. Instead, the two windings of this receiver are connected in a series-aiding manner with this series connection including a winding of a relay GR. In one specific embodiment of this invention the receivers A and B used were both of the kind shown in the Patent No. 1,733,982, to C. S. Bushnell, dated October 29, 1929.

The train-carried apparatus also includes an electro-pneumatic valve EPV which is diagrammatically illustrated in Fig. 1. When electrical energy is applied to this valve, the control of the air brakes on the train is under the direction of the engineer; but if this electrical energy applied to the valve is removed, the valve causes the air pressure for the brakes to be immediately reduced so that a service brake application follows. One valve EPV of this kind is shown in the Pat. No. 1,649,444, to C. S. Bushnell, dated November 15, 1927.

A speed governor SG is also shown diagrammatically in Fig. 1. Although illustrated in the drawing as being a speed governor of the centrifugal type, other types may be used without departing from the scope of the invention. One type of speed governor that may be used is illustrated in detail in the Pat. No. 2,457,748, to H. B. Taylor, dated December 28, 1948 As indicated in Fig. 1, the various governor contacts open at different train speeds for effecting different controls of the train-carried equipment at different train speeds.

The acknowledge contactor ACK is illustrated diagrammatically in Fig. 1 as controlling a plurality of contacts. This contactor also has associated with it a timing device which controls the contact 35. If the acknowledge contactor is continuously actuated for a relatively long time interval as, for example, in excess of 15 seconds, then the timing device, which is initiated into operation when the acknowledge contactor ACK is first operated, causes this contact to open. The circuit to the valve EPV is then opened and an automatic brake application occurs. This action makes futile any attempt to hold the acknowledge contactor ACK constantly actuated for the purpose of eliminating the requirement of acknowledging at each restrictive signal location. In one particular embodiment of the invention, the acknowledge contactor ACK which was used was of the type shown in Pat. No. 1,725,729 to C. S. Bushnell, dated August 20, 1929.

The suppression contactor SC shown in Fig. 1 prevents deenergization of the valve EPV under certain conditions even though the timing relay TD has dropped away and so opened the normally energized circuit for the valve EPV. If, for example, a restrictive control becomes effective on the train-carried equipment and a train is at that time moving at a speed in excess of the speed limit corresponding to that control, the timing relay TD becomes deenergized as will later be more fully described. The opening of front contact 36 of relay TD ordinarily results in the deenergization of the valve EPV so that an automatic brake application follows. But this action can be circumvented by the engineer's making a service brake application prior to the dropping away of relay TD. A service brake application causes an increase in pressure at the inlet pipe 37 to the brake suppression valve BSV so that the contacts 38 become closed through contact 39 on the cylinder of the brake suppression valve. In one embodiment of this invention, the brake suppression valve was of the kind illustrated in the patent to C. S. Bushnell, No. 1,757,410, dated May 6, 1930.

The train-carried equipment also comprises a number of electromagnetic relays. Among these are the negative-responsive and positive-responsive relays NR and PR, respectively, which are distinctively controlled in accordance with the variation of current taking place in the receiver secondary winding through the inductive effects of the wayside inductors. The clearing relay CR is controlled according to the current variations that take place in the windings of the receiver B as this receiver passes wayside inductors controlled to certain conditions.

The relay R3 is a penalty relay; the dropping away of this relay may occur, for example, through failure to acknowledge properly at the restrictive signal locations. When this relay drops away, the valve EPV becomes deenergized and an automatic brake application follows. The train-carried equipment can then be reset to its normal condition only by bringing the train to a very slow speed.

The slow release relay R5 is ordinarily dropped away whenever the train passes an inductor at a restrictive signal location. During the time that this relay R5 is dropped away, the acknowledge contactor ACK is required to be operated in order to prevent dropping away of the penalty relay R3.

The relay NRP is a repeater of the relay NR. One of its functions is to cause the receiver secondary circuit to be closed after this circuit has been opened at a restrictive signal location by the dropping away of the normally picked up relay NR.

The approach speed, limited speed, and high speed relays AS, LS, and HS, respectively, are selectively actuated in accordance with whether an approach, limited, or high speed control is received at a wayside inductor location. These relays store such a control only momentarily; the control is later transferred to a corresponding repeater relay, ASP, LSP, or HSP, depending upon the control received. These latter relays are provided with stick circuits which hold a control received at one wayside inductor location until another control is received at a following inductor location.

The timing relay TD is a slow release relay as indicated by the heavy base line for the symbol representing this relay. This relay TD is ordinarily required to be in a picked up position in order for the valve EPV to be energized. The energization of this relay TD is, in turn, dependent upon the train's speed being kept below the then effective speed limit as established by the control received from the wayside inductor last passed by the train.

The conditions of the various relays included in the vehicle-carried apparatus are those they assume when the apparatus has been properly "reset," no controlling influence has yet been received from a wayside inductor, and the train is moving below its most restrictive speed. The manner in which the various relays and contacts are caused to assume these conditions upon resetting will now be described.

Prior to the resetting operation about to be described, the various relays and devices remain in deenergized conditions. The reason that all of the relays and devices of Fig. 1 remain deenergized is that they receive electrical energy over wire 10, and this wire is normally energized from (+), through front contact 11 of relay R5 and front contact 12 of relay R3. But with relay R3, along with all the other relays, initially deenergized, the front contact 12 of this relay R3 is open so that electrical energy is not applied to the wire 10. Under this condition, the valve EPV is also deenergized, and, as will later be described, the brakes on the train cannot be released until this valve becomes energized.

With the train at a standstill, contact 13 of the speed governor SG is closed as indicated in Fig. 1. By actuating the acknowledge contactor ACK at this time, energy is applied from (+) through the whistle valve WV, back contact 14 of the acknowledge contactor ACK, closed contact 13 of the speed governor SG, and back contact 15 of the acknowledge contactor ACK, to the wire 10. With wire 10 now energized, a circuit is established through the winding of relay R3, the ballast lamp BL, and the primary winding PRI on the receiver A, to (—). This circuit causes the relay R3 to pick up and also energizes the receiver primary winding PRI. The ballast lamp BL is included in series with the primary winding to keep the energization of this winding at a fairly constant level despite variations in the value of the supply voltage that may occur. In this way, the degree of magnetization of the receiver is held substantially constant.

The electrical energy appearing on wire 10 as a result of actuation of the acknowledge contactor ACK during the resetting operation also causes current to flow from wire 10, through back contact 16 of relay NRP, the winding of relay PR, the secondary winding SEC, the winding of relay NR, the ballast lamp BL, and the primary winding PRI of the receiver to (—). Since the resistance of the relays NR and PR in series is fairly high, the amplitude of current through relays NR and PR and the secondary winding SEC is maintained at a fairly low value as compared to that existing in the receiver primary winding, and the number of ampere-turns contributed by the energization of the secondary winding to the magnetic circuit of the receiver is very small as compared to that furnished by the energized primary winding. However, the direction of current through this secondary winding is preferably such that the magnetic field that results aids rather than opposes the magnetic field established by the primary winding.

The normal current level through the receiver A secondary winding and the operating characteristics of the relays PR and NR are so selected in relation to each other that the normal receiver secondary current is greater than the pickup current level for relay NR but is below the drop away current level for the relay PR. Normally, therefore, the relay NR is picked up by the circuit just described while the relay PR remains dropped away. Since this circuit for the energization of relays NR and PR and the secondary winding also includes the ballast lamp BL, the amplitude of current through this circuit is maintained at approximately the same level and the respective conditions of relays PR and NR remains unchanged even though variations in supply voltage should occur.

With relay NR now picked up, a circuit is completed to energize the repeater relay NRP of relay NR. This circuit extends from the now energized wire 10, through front contact 17 of relay NR, wire 18, back contact 19 of relay HS, back contact 20 of relay HSP, back contact 21 of the acknowledge contactor ACK, back contact 22 of relay R5, back contact 23 of relay LSP, back contact 24 of relay ASP, and the winding of relay NRP to (—). As soon as this relay NRP is picked up, it is held up through a stick circuit which includes its own front contact 25.

When relay NRP is picked up, the opening of its back contact 16 opens the pick up circuit for relay NR, but this relay NR and the receiver secondary winding SEC remain energized through the stick circuit of relay NR which has now been established and which includes front contact 17 of this relay NR. Also, the picking up of relay NRP completes a circuit for the energization of relay R5. This circuit extends from wire 10 and includes front contact 26 of relay NRP, and the winding of relay R5 to (—). Now with relays R3 and R5 both energized, the acknowledge contactor ACK can be released as electrical energy is now applied to wire 10 from (+), through front contact 11 of relay R5 and front contact 12 of relay R3.

When energy first appears on wire 10 during the resetting operation, a circuit is completed to energize the slow release timing relay TD. This circuit is established from the wire 10, through back contact 27 of relay CR, contact 28 of the speed governor SG, back contacts 29, 30, and 31 of relays HSP, LSP, and ASP, respectively, and through back contacts 32, 33, and 34 of relays AS and LS and PR, respectively, and the winding of relay TD to (—). As soon as relay TD picks up, a circuit is completed from wire 10 which includes the normally closed contact 35 of the acknowledge contactor ACK and front contact 36 of relay TD to energize the valve EPV. With the valve EPV energized, the engineer is able to release the brakes and put the train into motion. The resetting operation is now completed and the various relays and devices are in the condition shown in Fig. 1.

INDUCTIVE RELATIONSHIPS

Before giving a detailed description of the manner of operation of this invention, it is believed that the description of the invention will best be facilitated by describing the different effects produced in the windings of the receivers A and B, as these receivers pass wayside inductors controlled to different conditions. These different effects on the receiver windings are illustrated graphically in Figs. 3–6. These graphical illustrations are not intended to show exactly the way in which the current through the windings of the receivers varies; they represent the current variations only in an approximate manner. To aid in the description of the various inductive relationships, a portion of the circuit organization of Fig. 1 as shown in Fig. 7 is provided so as to illustrate the circuit relationships involved in the control of relays NR and PR associated with receiver A and also relay CR associated with receiver B.

Figure 3:
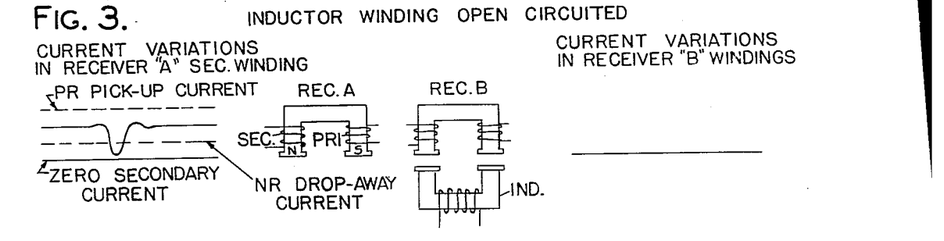
Figs. 3, 4, 5, and 6 illustrate respectively the different effects produced in the receiver windings as the wayside inductor is differently controlled for the various train controls.

When the receiver A on a train passes through an inductive coupling relationship with a wayside inductor having its control winding CW open circuited as in Fig. 3, the current in the secondary winding of the receiver experiences a substantial decrease. This current change results from an increase in flux through the core of the receiver A. The flux increase is produced by the lowering of the reluctance of the magnetic circuit for receiver A when this receiver is inductively coupled with the wayside inductor. The changing flux induces a voltage in the secondary winding which then produces the current change.

The normal current level in the receiver A secondary circuit is at a value above the drop-away current level for relay NR but below the pick-up current level for the relay PR as shown in Fig. 3. For this reason, the relay NR is normally picked up, but the relay PR in its normal condition is dropped away. The decrease in receiver A secondary current that occurs as this receiver passes an inductor having its control winding open circuited causes the relay NR to drop away. As already described, the relay NR (see Fig. 7) is maintained normally energized through a stick circuit which includes front contact 17 of this relay. Therefore, even a momentary reduction of the energizing current for relay NR sufficient to cause front contact 17 to open for an instant results in a complete deenergization and dropping away of the armature of this relay.

Upon the dropping away of relay NR, the circuit for the secondary winding of the receiver A is opened for a brief interval because of the opening of front contact 17. However, the dropping away of relay NR results in the deenergization of relay NRP because of the open front contact 19 of relay NR. Relay NRP drops away quickly, and by closing its back contact 16, causes the receiver's secondary circuit to again be closed. The effect on the receiver A secondary current caused by this momentary opening of the secondary circuit is not shown in Figs. 3–5; the actual effect on the waveform of a secondary current is negligibly small because of the very short time that the secondary winding is open-circuited.

When receiver B passes a wayside inductor having its control winding open-circuited, there is no voltage induced in the windings of receiver B and no current variation as shown in Fig. 3. Neither winding of receiver B is energized as has been explained, so that with the control winding of the wayside inductor open-circuited, no magnetic coupling takes place and there is no effect upon the windings of this receiver.

Figure 4:
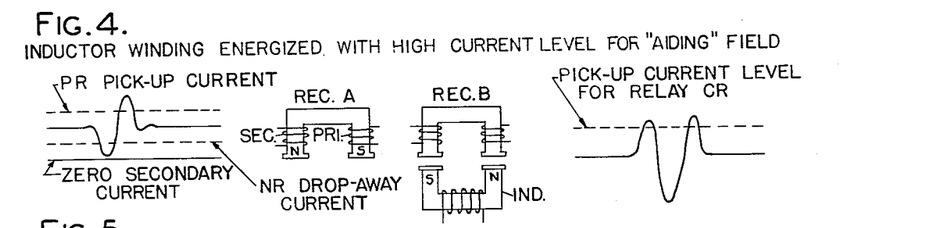

For transmitting one kind of restrictive train control, the control winding of the wayside inductor is energized at a relatively high current level with a polarity that results in a magnetic field for the wayside inductor having a polarity which "aids" the polarity of the magnetic field for the receiver A as shown in Fig. 4. The wayside inductor is considered to be magnetized with an "aiding" polarity when, with the receiver A and inductor exactly opposite each other, opposing legs of the receiver and inductor are of opposite polarity so that the receiver flux is increased. The opposite polarity of inductor magnetization is considered to provide an "opposing" magnetic field for similar reasons.

Under the conditions where the wayside inductor has its control winding energized to provide an aiding magnetic field, as in Fig. 4, the current level in the secondary winding of receiver A is first reduced to a level that is below the drop-away current value for relay NR when receiver and inductor become coupled together so that this relay quickly drops away. Shortly afterwards, the secondary current level rises momentarily above its normal value to an amplitude that causes relay PR to pick up. These current variations are illustrated in an approximate manner in Fig. 4.

Figure 5:
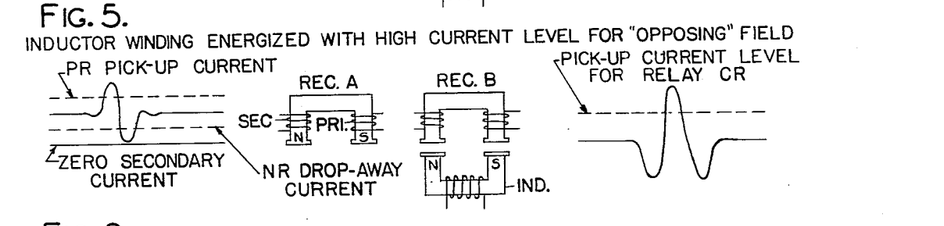

When a different kind of restrictive train control is desired to become effective on passing trains, the control winding of the wayside inductor is energized with a polarity opposite from that in Fig. 4 but still at the relatively high current level so that an opposing magnetic field is produced as in Fig. 5. In response to this condition, the current in the secondary winding of receiver A first rises above its normal value to an amplitude which causes relay PR to pick up and then shortly afterwards decreases to a value below its normal amplitude so that relay NR is dropped away. Thus, the change in polarity of the control winding still causes both the relays PR and NR to be affected, but with a different sequence of operation. With the control winding CW energized for aiding polarity as in Fig. 4, relay NR drops away first followed by the picking up of relay PR. But with the control winding energized for an opposing field as in Fig. 5, the relay PR first picks up followed by the dropping away of relay NR.

For each of these conditions which has just been described wherein both the relays PR and NR have been actuated as a result of energization of the inductor control winding CW, it has been assumed that the energization of the control winding has been at a relatively high level so that a strong magnetic field for the inductor has been produced. Such a strong magnetic field is required in order that a substantial flux variation occur in the core of receiver A. As previously described, the strong magnetic field is required primarily because of the effect of the low impedance circuit associated with the primary winding of this receiver. This low impedance circuit causes the primary winding to act, in effect, as a choke and tends to prevent rapid flux changes from occurring in the receiver core in response to a weak, external magnetic field.

The receiver B is not provided with any energized winding having a low impedance circuit equivalent to the primary winding of receiver A. Therefore, a far less intense magnetic field for the wayside inductor resulting from a lower amplitude of direct current in its control winding is still effective to produce substantial flux changes in the core of receiver B. It was found in one embodiment of this invention that for the lower current level in the control winding, an amplitude of current approximately one-tenth as great as that employed to give the highest level of magnetization was effective.

When the control winding of a wayside inductor is energized at the higher current level, voltages having a fairly substantial amplitude are induced in the windings of receiver B. Thus, when the control winding is energized to provide an aiding magnetic field as in Fig. 4, the current variation in the winding of relay CR comprises first a current increase of one polarity, then a variation of current of opposite polarity, followed again by another current variation similar to the first as approximately indicated in Fig. 4. When the control winding of the wayside inductor is energized with a polarity to produce an opposing magnetic field but is still energized with the higher current level, a similar current variation takes place in the winding of relay CR except that the polarity of the current variation is now reversed so that it appears about as shown in Fig. 5.

When the control winding CW of a wayside inductor is energized with a polarity that supplies an opposing magnetic field to a passing receiver on a train as in Fig. 5, but the current is then reduced in amplitude so that the magnetic field of the inductor becomes weaker, the current variation that takes place in the winding of relay CR is similar to that occurring with the higher level of current of the same polarity. Substantially the only difference is that the amplitude of the current variations is somewhat reduced as shown in Fig. 6.

Relay CR is preferably a polar type of relay in that actuation of its armature occurs only in response to energization of its winding with a particular polarity of current. The advantage of using a polar relay is that such a relay is more responsive to a momentary energization such as occurs in the winding of relay CR when the train passes an inductor at high speed. In this embodiment of the invention, the lower winding of relay CR is so connected to the windings of the receiver B that only the "positive" current variations produce actuation of this relay although the opposite polarity may as well be selected. In other words, when the control winding CW is energized to provide an aiding magnetic field as in Fig. 4, the current through the winding of relay CR would ordinarily rise above the pickup value of current for this relay twice in succession as the train-carried receiver passes the wayside inductor. However, with the opposite polarity of energization for the control winding as in Figs. 5 and 6, the current through the winding of relay CR rises above its pickup value only once.

Figure 6:
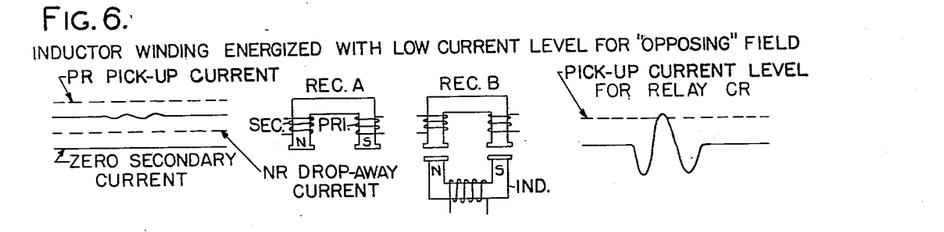
Figure 7:
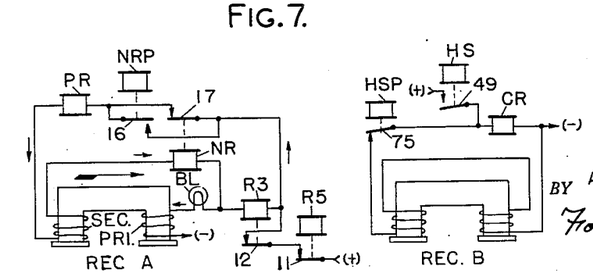
Fig. 7 shows a portion of the circuit of Fig. 1, particularly that portion involving the two receivers and the relays directly controlled by these receivers.

Because of the effect of the primary winding circuit on receiver A, the low level of magnetization of the wayside inductor ordinarily produces only insignificant current variations in the receiver secondary circuit as shown in Fig. 6. It has been found, however, that when the control winding is energized with a polarity that provides an aiding magnetic field with respect to the receiver A, the secondary winding current may at times decrease sufficiently to cause the relay NR to drop away. However, when the control winding is energized with a polarity that magnetizes the core of the inductor with an opposing magnetic field, then the current variation in the receiver's secondary winding is not of sufficient amplitude to result in actuation of the relays PR and NR. It is for this reason that energization of the control winding at the lower current level to give a clearing control is preferably accomplished with a current polarity that will produce a magnetic field for the inductor that opposes the magnetic field of the receiver A as established by its primary winding.

As previously mentioned, the receiver A may be constructed so that the secondary rather than the primary winding is towards the front of the vehicle. Then during normal forward movement of the vehicle, the waveform of receiver secondary current caused by wayside inductors having their control winding energized at the higher current level is substantially opposite that shown in Figs. 4 and 5. In other words, the receiver having its secondary winding toward the front but with relative polarities of primary and secondary magnetization unchanged and becoming inductively coupled with a wayside inductor controlled to supply an aiding magnetic field as in Fig. 5 experiences a current change in its secondary winding that comprises a current increase followed by a current decrease as shown in Fig. 5 rather than the opposite condition illustrated in Fig. 4. Similarly, a receiver in this condition and becoming inductively coupled with an inductor energized to have an opposing magnetic field as in Fig. 5 experiences instead a secondary current change approximately like that shown in Fig. 4.

The reason for this effect is believed to be that the circuit associated with the secondary winding of the receiver is of relatively high impedance; whereas, the circuit associated with the primary winding is of considerably lower impedance. The coupling of the leg of the receiver A bearing the secondary winding with a wayside inductor thus is believed to produce a substantially greater effect on secondary current than when the leg bearing the primary winding is so inductively coupled. This dissymmetry with respect to the two legs of the receiver structure causes the effect produced in the receiver's secondary circuit to be dependent upon whether the leg bearing the primary or the secondary first becomes inductively coupled with the wayside inductor.

OPERATION

Normal condition

The normal condition of most of the train-carried equipment has already been described. The relays HSP, LSP, and ASP as well as the relays HS, LS, AS, and CR initially remain deenergized when the train-carried equipment is first put into its normal operating condition by the resetting operation previously described. With relays HSP, LSP, and ASP deenergized, the train speed should not be allowed to exceed the predetermined low speed limit because the dropped away condition of these relays causes relay TD to be energized through the respective back contacts 29, 30, and 31 of these relays and through contact 28 of the speed governor SG. Increasing the speed above this low speed limit causes contact 28 to open and relay TD to be deenergized with a resulting deenergization of the valve EPV. This action causes the brakes to be automatically applied unless a service brake application is immediately made so as to close the suppression contact SC as already explained.

Receiving most restrictive or "stop and proceed" control

When the train-carried receiver A passes through an inductive coupling relationship with a wayside inductor that has its control winding CW open-circuited, a momentary decrease of the normal current level through the secondary winding of the receiver results. This current decrease causes relay NR to drop away but does not affect relay PR since the level of current through this relay PR does not rise above the pick-up level of current required for this relay. Also, as has been described, there is no effect upon the receiver B so that the condition of relay CR is not affected.

With relay NR deenergized, its front contact 17 opens to thereby open the secondary circuit of receiver A. Relay NRP then drops away as indicated in Fig. 7 because of the opening of front contact 9 of relay NR. Relay NRP drops away quickly thereby again closing the secondary circuit of receiver A at back contact 16 of relay NRP, and relay NR picks up once more as the secondary current increases toward its normal value. Relay NRP cannot again become picked up at this time because of its open front contact 25.

Figure 8:
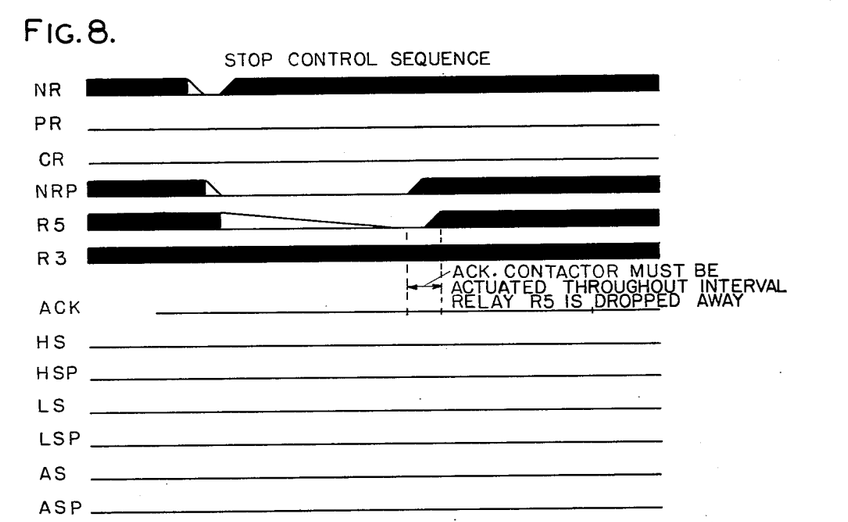
Figs. 8, 9, 10, 11, and 12 are timing charts which indicate the sequence of relay operations in response to the different received controls.
Figure 9:
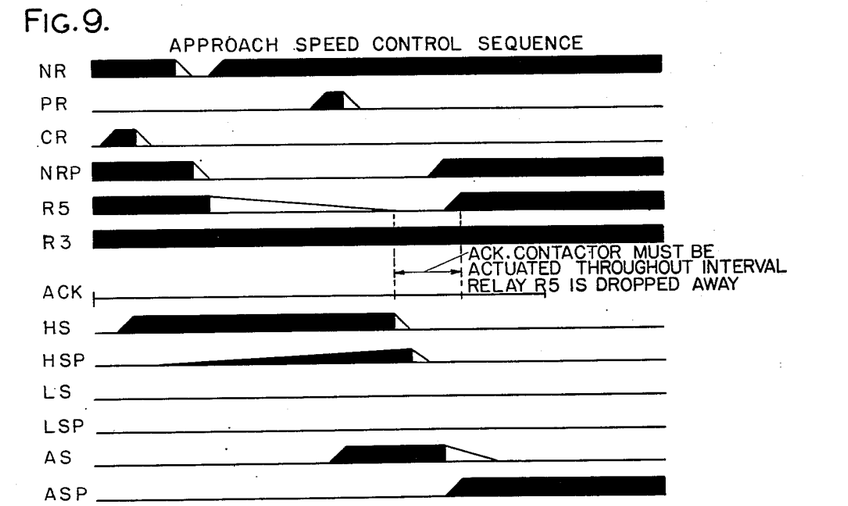
Figure 10:
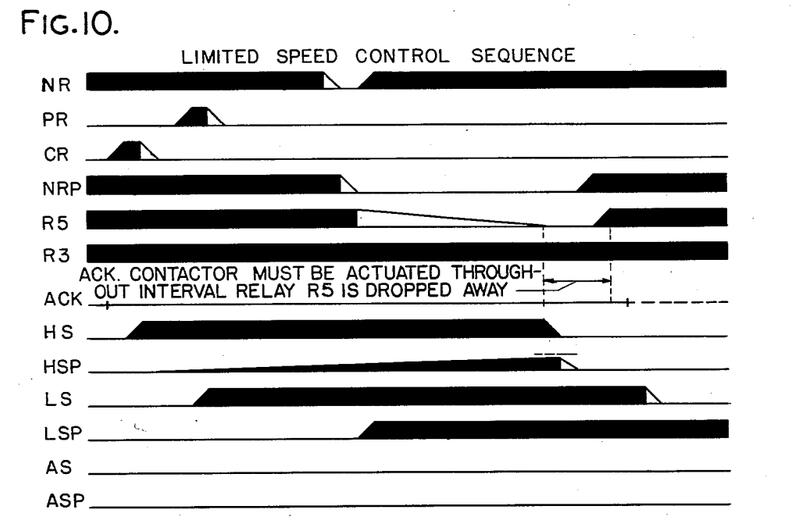
Figure 11:
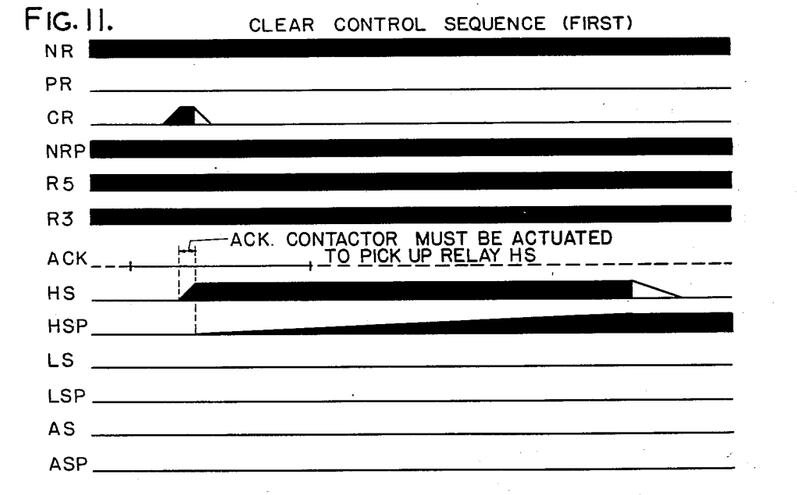

The dropping away of relay NRP also opens its front contact 26 so that relay R5 is deenergized as indicated in Fig. 8. The resulting release of relay R5 after a short interval due to its slow drop-away characteristics would ordinarily result in the removal of energy from wire 10. But this can be circumvented by timely operation of the acknowledge contactor ACK so as to close back contact 14 of this contactor ACK before relay R5 drops away and thereby maintain the wire 10 energized. During the interval that relay R5 is dropped away and the acknowledge contactor is actuated, current passes through the whistle valve WV causing it to sound, to thereby indicate that a restrictive control was received that caused relay R5 to drop away. The dropping away of relay R5 also causes front contact 40 of this relay to open the stick circuits of relay HSP, LSP, and ASP. As will later be more fully explained, when any one of the relays HSP, LSP, or ASP is in a picked up condition, either a high speed, limited speed or approach speed control, respectively, is then in force. The dropping away of relay R5 ensures, by opening the stick circuits for these relays, that they are all dropped away so that the most restrictive control comes into effect.

When back contact 22 of relay R5 closes and, assuming that the acknowledge contactor ACK has previously been actuated as required so as to close its back contact 21, the pick-up circuit for relay NRP previously described is again established so that this relay picks up. Once picked up, relay NRP is maintained energized through its own front contact 25. With relay NRP picked up, the pick-up circuit for relay NR is thereby opened again by the opening of back contact 16 of relay NRP so that the receiver secondary circuit is once more closed and relay NR held energized only through the front stick contact of relay NR. Also, with relay NRP now picked up again, its front contact 26 is closed to energize relay R5. When relay R5 picks up and closes its front contact 11, energy is once more applied through this contact to wire 10 so that the acknowledge contactor ACK can be released.

The circuit conditions that are thus established when the receiver A passes a wayside inductor having its control winding CW open-circuited, results in the relays HSP, LSP, and ASP being dropped away if any one of them has previously been picked up. With the respective back contacts 29, 30, and 31 of these relays closed, the energizing circuit for relay TD is required to be completed through contact 28 of the speed governor SG. The train speed should then not exceed the selected speed at which this speed governor contact opens as the relay TD would otherwise become deenergized, and this would require that the brakes be applied immediately to restore the train speed to the proper level under penalty of an automatic brake application.

During the time that the train-carried apparatus is affected by the wayside inductor, the acknowledge contactor ACK is required to be maintained in its actuated condition so that wire 10 will remain energized through back contact 14 of this contactor during the interval that relay R5 is dropped away (see Fig. 8). Otherwise, the penalty relay R3 is dropped away, and, if this happens, subsequent actuation of the contactor ACK will not suffice to reenergize wire 10 because of the open front contact 12 of relay R3. The valve EPV then becomes deenergized and an automatic brake application follows. The train-carried equipment can then be restored to its normal operating condition only through the resetting operation already described. This resetting can take place only when the train speed has been sufficiently reduced to allow contact 13 of the speed governor SG to close. This requirement of a very low train speed before resetting can occur is the penalty inflicted for failure to acknowledge the restrictive signal.

The pneumatic train brake system may be organized so that the brakes cannot immediately be released following an automatic brake application until a certain time has elapsed even after the train-carried equipment such as shown in Fig. 1 has been reset to its normal condition and the valve EPV again energized. The means for such control may take the form illustrated in Pat. No. 1,855,595 to C. S. Bushnell, dated April 26, 1932. When the brakes are applied by the engineer, they can quickly be released by him. It is to his interest, therefore, to prevent an automatic brake application. Otherwise the brakes remain applied for a time even after the train speed has been reduced to the level where closure of speed governor contact 13 allows resetting to occur so that the train is, in practice, usually required to be brought to a full stop.

Reception of approach speed control

When a train equipped with the train control apparatus of this invention passes through an inductive coupling relationship with a wayside inductor having its control winding CW energized with the high current level of a polarity to provide an aiding magnetic field, both receivers A and B are inductively affected. The receiver B is first inductively affected and then the receiver A. As already explained, this sequence occurs for the reason that the receiver B is preferably mounted on the train ahead of the receiver A so that receiver B is the first to be inductively affected by a wayside inductor when the control winding of such inductor is energized with direct current.

The effect on the current in the winding of the receiver B as this receiver passes an inductor controlled according to the conditions shown in Fig. 4, is to cause the armature of relay CR to be operated to its left-hand position. Although the acknowledge contactor is actually required to be closed only during the interval that relay R5 is dropped away, the engineer in practice maintains this contactor in its actuated condition from a time just prior to the train's arriving at the inductor location until the locomotive and its receivers have passed the inductor. For this reason, back contact 41 of the acknowledge contactor is closed at the time relay CR picks up. Therefore, when relay CR picks up a circuit is completed to energize the relay HS. This circuit extends from wire 10 and includes back contact 41 of the acknowledge contactor ACK, right-hand contact 42 of relay CR, and the winding of relay HS, to (—).

Relay CR may remain picked up for only a very short interval. At high train speeds, the time base of the current variations through the windings of receiver B is so compressed that the current is above the pick-up value for relay CR for only a short time. Since relay CR is a polar type of relay, the current variation of opposite polarity that immediately follows causes relay CR to be actuated back to its original condition.

Although the picking up of relay CR may be momentary, relay HS will still be picked up. The reason is that during the short time that right-hand contact of relay CR is closed, the circuit described above not only is effective to energize the winding of relay HS but is also effective to charge capacitor 43 through the limiting resistor 44 and front contact 45 of relay R5. Therefore, even though relay CR should drop away before relay HS is fully picked up, the subsequent discharging of capacitor 43 through front contact 45 of relay R5 and the upper winding of relay HS will result in the picking up of this latter relay. Once relay HS is picked up, it remains in this condition because of the stick circuit which is established from wire 10, through front contact 46 of relay R5, back contact 47 of relay HSP, front contact 48 of relay HS, and the lower winding of relay HS, to (—).

To ensure that relay CR is restored to its original dropped away condition after being picked up, a circuit is provided upon the picking up of relay HS to actuate relay CR back to its original condition. This circuit is provided by the closing of front contact 49 of relay HS which causes a current to flow through the upper winding of relay CR to (—) in a direction which produces an opposing magnetomotive force with respect to that provided for the lower winding when the receiver B became inductively coupled with the wayside inductor.

When relay HS picks up, a circuit is completed from wire 10, through front contact 50 of relay HS, resistor 51, and the lower winding of relay HSP, to (—). At the same time, the closure of front contact 52 of relay HS causes the capacitor 53 to be connected across the lower winding of relay HSP. Normally, this capacitor 53 is discharged because its left-hand terminal is connected to (—), and its right-hand terminal is connected through closed back contact 52 of relay HS to (—) also. With this discharged capacitor connected across the lower winding of relay HSP at the same instant that the pick-up circuit for this relay is completed through front contact 50 of relay HS, relay HSP is prevented from picking up quickly because the relatively high charging current for capacitor 53 produces a sufficiently large voltage drop across resistor 51 so that the voltage impressed across the lower winding of relay HSP is not effective to cause this relay to pick up. As capacitor 53 continues to charge, the charging current for this capacitor decreases and with it the voltage drop across resistor 51 also decreases so that a constantly greater potential is applied to relay HSP until this relay finally picks up. The values for the components for this circuit are so selected that relay HSP does not pick up until sufficient time has elapsed for the train to move far enough down the track so that receiver A becomes inductively coupled with the wayside inductor.

Since the picking up of relay HSP results in a clearing or high speed control becoming effective on the train, the delay in picking up relay HSP prevents such control from becoming effective until the receiver A has passed the wayside inductor. When the relays PR and NR directly associated with receiver A are inductively affected as receiver A passes the wayside inductor, this is an indication that the wayside inductor was controlled to provide a restrictive rather than a clearing control, and the relay HSP is then prevented from being picked up as will shortly be described. However, if neither relay PR nor NR is affected, then it is an indication that the control winding of the wayside inductor was energized with the lower current level which was effective only to pick up relay CR and not to affect the relays PR and NR which are associated with receiver A. In that event, the relay HSP is allowed to pick up and the clearing control then becomes effective.

Under the present condition, wherein the control winding of the wayside inductor is energized at the high current level and with a polarity to provide an aiding magnetic field, the relay CR has momentarily been picked up, and this has caused the picking up of relay HS which stays picked up for a time because of its stick circuit. This is then followed by the energization of relay HSP which is provided with slow pick up characteristics by reason of its shunting capacitor 53 and series resistor 51.

Now when receiver A passes the wayside inductor, the current through the secondary winding of receiver A is first decreased substantially below its normal value so that relay NR drops away. The secondary winding circuit is then opened at front contact 17 of this relay NR and relay NRP is, at the same time, deenergized and drops away. The dropping away of relay NRP causes its back contact 16 to close so that the receiver secondary circuit is again completed and relay NR again picks up as the receiver secondary current rises once more towards its normal level. The dropping away of relay NRP also causes its front contact 26 to open so that relay R5 is deenergized. But this relay R5 does not immediately drop away because of its slow release characteristics.

After a short time, which is dependent primarily upon the speed of the train, the current in the secondary winding of receiver A rises above its normal value so that the relay PR is picked up as indicated in Fig. 4. The capacitor 54 which is normally charged as a result of being connected to the energized wire 10 through back contact 55 of relay PR and the current limiting resistor 56, is now connected across the winding of relay AS because of the closure of front contact 55 of relay PR and because back contact 57 of relay NRP is now closed.

Even though relay PR should be picked up for only a brief instant at the higher train speeds, the charged capacitor 54 is effective not only to energize the winding of relay AS but also to charge the capacitor 58 which, in series with limiting resistors 59 shunts the winding of relay AS. Following the dropping away of relay PR, the energization of relay AS is maintained by the continuing discharge of the now charged capacitor 58 so that relay AS finally picks up. Upon picking up, this relay AS is maintained in this condition by being energized over a stick circuit which extends from wire 10 and includes front contact 60 of relay AS, back contact 61 of relay NRP, and the winding of relay AS, to (—).

When relay AS picks up, its front contact 67 closes, thereby connecting wire 10 to the left-hand terminal of relay PR. This action, in effect, shunts the winding of relay PR through back contact 16 of relay NRP, thereby ensuring that relay PR is restored to its original dropped away condition.

When relay R5 finally drops away, the opening of its front contact 40 interrupts the stick circuits for the relays HSP, LSP, and ASP. As a result, any control previously received is cancelled so that the newly received control can be effective in causing the picking up of the proper one of these relays.

At the same time, the front contact 46 of relay R5 is opened so that the stick circuit to relay HS is interrupted. Also, front contact 45 of relay R5 is opened at this time so that the capacitor 43 and resistor 44 no longer shunt the upper winding of relay HS. The interruption of the stick circuit for relay HS deenergizes the lower winding of this relay, and the removal of the shunt of the upper winding by capacitor 43 allows this relay to drop away quickly.

As soon as relay HS drops away, the pick-up circuit for relay HSP is opened at front contact 50, and the opening of front contact 52 also causes the capacitor 53 to no longer shunt the lower winding of this relay. With both pick up and stick circuits for this relay HSP opened, the relay HSP is prevented from finally picking up as it ordinarily would have if relay R5 had not dropped away and, if relay HSP has by chance just picked up at the instant of dropping away of relay R5, the opening of the stick circuit at front contact 40 prevents relay HSP from staying picked up.

With the various relays HS, HSP, R5, LSP, and ASP all dropped away, and assuming that the acknowledge contactor had been actuated as required so as to close back contact 21, the pick-up circuit for relay NRP is completed. When this relay NRP picks up it again is held up through a stick circuit which includes its own front contact 25.

The initiation of the various events which lead to the picking up of relay NRP as just described is due to the dropping away of relay R5. Relay R5 must, therefore, be provided with sufficiently slow release characteristics so that it does not drop away following its deenergization until relay PR has first picked up and dropped away again. Otherwise, capacitor 54 would erroneously be connected across the winding of relay LS when relay NRP picks up might and causes this relay LS to pick up. Such an event would not result in a less restrictive or limited speed control from becoming effective on the train as will later be described. Instead, none of the relays ASP, LSP, or HSP would then be picked up and under these circumstances the most restrictive speed control would come into effect.

Assuming that relay AS has been properly picked up, and that this is followed by the picking up of relay NRP as described, a circuit is then completed from wire 10 and including front contact 62 of relay NRP, front contact 63 of relay AS, and the winding of relay ASP to (—). Relay ASP then picks up and is held in this condition by a stick circuit established from wire 10 through front contact 40 of relay R5, back contact 64 of relay HSP, and front contact 65 of relay ASP, and the winding of relay ASP to (—).

The picking up of relay ASP causes a circuit to be closed for the energization of relay TD which includes wire 10, right-hand contact 27 of relay CR, contact 66 of the speed governor SG, front contact 31 of relay ASP, back contact 32 of relay AS, back contact 33 of relay LS, back contact 34 of relay PR, and the winding of relay TD to (—). With relay TD now energized through contact 66 of the speed governor, the train should not be operated at a speed in excess of that which causes this contact to open; otherwise the relay TD will after a short interval be dropped away. During this interval, the whistle valve WV will be deenergized and will thus provide an audible warning that the brakes should be applied. If the brakes are applied by the engineer, the brake suppression valve BSV will be actuated to shunt open front contact 36 so that the valve EPV will remain energized even though relay TD should drop away. If the brakes are not thus applied by the engineer, the valve EPV becomes deenergized and a service brake application is automatically made.

The energizing circuit for relay TD includes back contacts of relays PR, LS, AS, and a right-hand contact of relay CR. One or more of these relays may be actuated when a train passes an inductor, causing the circuit for relay TD to be opened. Ordinarily such open-circuiting is only for a brief interval and relay TD does not drop away. If, however, any of these relays should fail to restore to its original condition, relay TD would drop away and produce the results previously described. Consequently, any failure of these relays to be properly restored cannot result in an unsafe condition.

Reception of limited speed control

When a train provided with the apparatus shown in Fig. 1 passes a wayside inductor having its control winding energized at the higher current level and with a polarity to provide an opposing magnetic field, a limited speed control becomes effective on the train.

The receiver B passes the wayside inductor first and the effect of the magnetic field of the wayside inductor is to cause the current through relay CR to rise above the pick-up current level for this relay so that it is actuated to a picked-up condition. Assuming that the acknowledge contactor ACK has been actuated as required, a circuit is completed from wire 10 and through back contact 41 of the acknowledge contactor, and left-hand contact 42 of relay CR to energize relay HS. When relay HS picks up, a stick circuit is completed to hold this relay in this condition and, at the same time, relay CR is driven to its normal dropped-away condition. The picking up of relay HS also caused the relay HSP to be energized, but this relay cannot pick up for some time because of the slow pick-up characteristics provided for it by the shunting capacitor 53 and series resistor 51.

During the interval that relay HSP is energized but before it is picked up, the receiver A passes through an inductive coupling relationship with the wayside inductor. The first effect on the secondary current of this receiver is that it increases above its normal level so that relay PR is picked up. With relay PR picked up, the capacitor 54, which is normally charged through its being connected to wire 10 through back contact 55 of relay PR and the current limiting resistor 56, is now connected through front contact 57 of relay NRP across the lower winding of relay LS. Even though the picking up of relay PR may be only momentary at higher train speeds, relay LS still is picked up for reasons previously given.

When relay LS is in its normal dropped away condition, capacitor 68 is charged by reason of its left-hand terminal being connected through back contact 69 of relay LS and the current limiting resistor 70 to the energized wire 10 while the right-hand terminal of this capacitor is connected to (—). As soon as front contact 69 of relay LS closes, this charged capacitor 68 is connected across the upper winding of relay LS. The flow of current that results through this upper winding causes relay LS to remain picked up for a time. Also, front contact 8 of relay LS closes, thereby shunting relay PR and ensuring that it will drop away.

The current increase in the secondary winding of receiver A is followed by a current variation of opposite polarity which reduces the current below the drop-away value of current for relay NR so that this relay drops away. With front contact 9 of relay NR open, relay NRP is deenergized. As before, the dropping away of relay NRP closes the secondary winding circuit at back contact 16, this secondary circuit having been opened by the dropping away of relay NR which caused front contact 17 to open.

When relay NRP drops away, its front contact 26 opens so that relay R5 is deenergized. This relay R5 does not drop away immediately, however, because of its slow release characteristics. Another effect produced by the dropping away of relay NRP is the completion of a circuit extending from wire 10 and including back contact 62 of relay NRP, front contact 71 of relay LS, and the winding of relay LSP to (—). Upon being picked up, the relay LSP is maintained picked up by a stick circuit established over wire 10, front contact 72 of relay LS, front contact 73 of relay LSP, and the winding of relay LSP, to (—).

After a while the relay R5 finally drops away. The opening of front contacts 46 and 45 of relay R5 causes relay HS to drop away. This causes the energizing circuit for relay HSP to open so that this relay does not have an opportunity to pick up. The stick circuits for relays HSP, LSP, and ASP are all opened by the opening of front contact 40 of relay R5. Relay LSP is still maintained picked up, however, through the stick circuit which is provided for it through the front contact 72 of relay LS. Open-circuiting the stick circuits for the relays ASP and HSP ensures that these relays are dropped away if either of them has previously been in a picked up condition due to some earlier received control.

A pick-up circuit is now completed for the relay NRP. This circuit extends from wire 10 and includes back contact 19 of relay HS, back contact 20 of relay HSP, back contact 21 of the acknowledge contactor ACK, back contact 22 of relay R5, front contact 77 of relay LS which is still held in a picked up condition by the discharging capacitor 68, back contact 24 of relay ASP, and the winding of relay NRP to (—). Upon being picked up, relay NRP is provided with a stick circuit to maintain it energized, and this stick circuit includes its own front contact 25.

The picking up of relay NRP again closes the pick up circuit for relay R5 at the now closed front contact 26. With front contact 40 of relay R5 closed, an alternate stick circuit is provided for the relay LSP. This circuit includes wire 10, front contact 40 of relay R5, back contact 64 of relay HSP, front contact 73 of relay LSP, and the winding of relay LSP to (—). With relay LSP maintained energized over this stick circuit, relay LS is now free to drop away and thereby open the stick circuit at front contact 72 which has thus far been effective to hold relay LSP energized. Relay LS finally drops away because the shunting capacitor 68 is finally discharged to such a low level that relay LS cannot be maintained in its picked up condition.

Since relay LSP is now picked up, whereas the relays ASP and HSP are dropped away, the energizing circuit for relay TD now includes wire 10, right-hand contact 27 of relay CR, contact 73 of the speed governor SG, front contact 30 of relay LSP, back contact 31 of relay ASP, back contact 32 of relay AS, back contact 33 of relay LS, back contact 34 of relay PR, and the winding of relay TD to (—). The energizing circuit for relay TD is thus now routed through contact 73 of the speed governor SG which, therefore, requires that the train speed be kept below the specified limit at which this contact 73 opens. If this speed limit is not observed, the relay TD will drop away, and this will result in an automatic brake application unless the brakes are first applied voluntarily by the engineer so as to cause actuation of the brake suppression valve BSV.

According to the description that has been given, the picking up of relay PR, before relays NR and NRP drop away, causes relay LS to be picked up. However, the picking up of relay LSP is dependent upon the eventual dropping away of relay NRP so as to close back contact 62 of this relay. This circuit organization guards against the possibility that premature dropping away of the relay R5 will result in a limited speed control from being established on a train when actually the more restrictive approach speed control should become effective. When the wayside inductor has its control winding energized in a manner to transmit an approach speed control, the relays NR and NRP first drop away when receiver A passes the inductor and then relay PR picks up. This sequence causes the relay AS to be actuated. As was previously mentioned, however, if relay R5 should drop away too quickly, the relay NRP would be picked up prior to or during the time that relay PR is picked up, and this would cause the capacitor 54 to be connected through front contacts 55 and 57 of relays PR and NRP across the winding of relay LS so that this relay LS rather than the relay AS would be picked up. The picking up of relay LS under these conditions, however, cannot result in the picking up of relay LSP because the pick-up circuit for relay LSP includes the back contact 62 of relay NRP. Since relay NRP has already cycled and is now in its normal picked-up condition, the relay LSP cannot be picked up and a limited speed control cannot become effective.

*Reception of clearing control*

When a train provided with the apparatus of Fig. 1 passes a wayside inductor with its control winding energized at the lower current level and with a polarity to provide an aiding magnetic field as in Fig. 6, a clearing control becomes effective on the train, and this control permits the train to operate at the highest speed limit.

The receiver B passes the wayside inductor first and the effect of the magnetic field of this inductor on the windings of receiver B causes the current through relay CR to rise above the pick-up current level for relay CR so that this relay is picked up. Since it is assumed that this clearing control is the first received control of this kind after any one of the several restrictive controls has previously been received, the acknowledge contactor ACK is required to be actuated as the train passes the wayside inductor. Actuation of the acknowledge contactor ACK is required in order that its back contact 41 may be closed and thereby close the pick-up circuit for relay HS through left-hand contact 42 of relay CR. When relay HS picks up, it is held picked up through a stick circuit which includes the energized wire 10, front contact 46 of relay R5, back contact 47 of relay HSP, front contact 48 of relay HS, and the winding of relay HS to (—).

The energization of relay HS causes a pick-up circuit for relay HSP to be closed. This circuit includes the front contact 50 of relay HS, resistor 51 and the winding of relay HSP. Relay HSP is slow to pick up because of the capacitor 53 which now shunts its lower winding through front contact 52 of relay HS.

At some time during this interval that relay HSP is energized but before it is picked up, the receiver A finally passes through an inductive coupling relationship with the wayside inductor. Since the wayside inductor has its control winding energized at the lower current level for a clearing control, there is very little effect on the current in the secondary winding circuit of receiver A. Neither the PR nor NR relays associated with this secondary winding are actuated. Consequently, the pick-up circuit for relay HSP is not interrupted because relay R5 remains steadily energized under this condition. Finally, therefore, after a suitable time interval relay HSP picks up. When it does, it opens its back contact 47 included in the stick circuit for relay HS so that relay HS drops away. At the same time, a stick circuit is completed to hold relay HSP picked up. This circuit includes wire 10, front contact 40 of relay R5, and front contact 64 of relay HSP. Although one of the other speed control relays such as ASP or LSP may have been in a picked-up condition just prior to this time, the opening of back contact 64 of relay HSP causes the stick circuits for these relays ASP and LSP to be opened so that either one of these that is picked up at this time is now dropped away.

The picking up of relay HSP causes the relay TD to now be energized through a circuit which includes the front contact 29 of relay HSP. This pick-up circuit for relay TD must then also include contact 74 of the speed governor SG. Since this contact 74 does not open unless the train speed exceeds the authorized maximum speed, all train speeds below this limit will cause the relay TD to remain energized and thereby prevent automatic application of the brakes.

*Reception of clear control (successive)*

Figure 12:
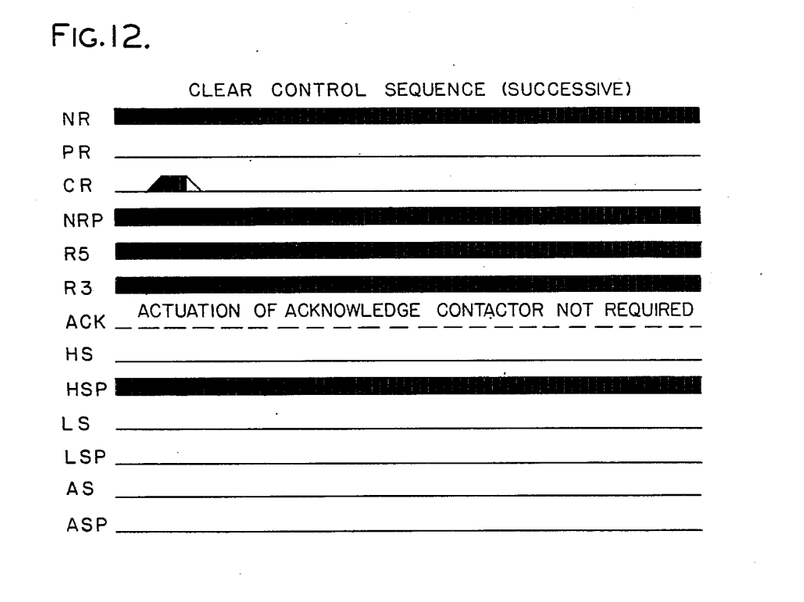

When a train is operating in response to a previously received clearing control, the relay HSP is held energized through the stick circuit which has already been described. With relay HSP picked up, the circuit which includes the windings of receiver B and the winding of relay CR is opened at the open back contact 75 of relay HSP. Consequently, this relay CR cannot be affected at subsequent clear signal locations and the clearing control remains steadily effective (see Fig. 12). Operation of the acknowledge contactor is not required under these circumstances.

If a train passes an inductor controlled to give a restrictive control at a time when relay HSP is picked up, the receiver A is inductively affected even though relay CR cannot be picked up. The selective actuation of relays NR and PR that then occurs causes relay R5 to eventually drop away. With front contact 40 of relay R5 open, relay HSP drops away, thereby cancelling the clearing control.

WAYSIDE APPARATUS

Fig. 2 illustrates one possible way in which the wayside signalling organization may be effective to control the wayside inductors. A typical portion of trackway signalled by a line wire block signalling system is shown. The principles of this invention apply equally well, however, regardless of the particular type of wayside signalling system used.

Each track section such as the track section 2T has connected to its rails at the exit end thereof a track battery 2TB connected in series with a current limiting variable resistor 2LR. At the entrance end of each track section, a track relay TR is connected across the rails. A home-distant relay HD is also located at the entrance end of each track section. This relay is controlled over line wires extending from the next signal location ahead. The relay HD is of the kind known commonly as a polar-retained neutral relay as previously mentioned. The polarity of the energization applied to each HD relay is determined by whether the HD relay for the track section ahead is picked up or dropped away. Assuming that the track sections 2T and 3T are unoccupied so that track relays 2TR and 3TR are picked up, then front contacts 80 and 81 of relay 3TR are closed as well as front contacts 82 and 83 of relay 2TR so that energy is applied over the line wires 84 to the relay 2HD. If relay 3HD is picked up, the polarity of the energization applied to relay 2HD is such that the polar contacts of this relay are assumed to be operated to their right-hand positions; however, if the relay 3HD is dropped away, the polarity of energization applied to relay 2HD is reversed so that its polar contacts are actuated to their left-hand position.

At each signal location there is an approach relay such as the relay 3A at the signal S3 location. This relay has its winding included in the line wire circuit including line wires 84 extending from this signal S3 location to the relay 2HD at the entrance of track section 2T. A function of this relay is to prevent energy from being applied to the control winding of the wayside inductor and to the lamps of the wayside signal at the S3 signal location except when there is a train in approach of the signal S3.

The wayside signalling apparatus shown in Fig. 2 is illustrated in this drawing as being in the normal condition, i. e., the condition it assumes when traffic conditions warrant train movement at maximum authorized speed and when there is no train in occupancy of any of the track sections shown. Consequently, the track relay TR at the entrance to each track section is picked up. Also, each HD relay such as the relay 2HD is energized because of the closed front contacts of the relays 2TR and 3TR. With each relay HD picked up, the polarity of the energy applied over the line wires to the HD relay at the next preceding signal location is such as to cause the polar contacts of such HD relay to be operated to their right-hand positions. At the same time, each approach relay such as relay 3A is picked up and its associated repeater relay AP is also energized. The relay 3AP is energized, for example, through front contact 64 of relay 3A.

To facilitate in the description of the wayside apparatus, it will be assumed that there is a train occupying track section 5T. A following train will then be assumed to be progressing through the track sections 1T, 2T, 3T, and 4T, in order, with its train control apparatus receiving a different control at each wayside signal location and with the controls becoming progressively more restrictive as the following train approaches the occupied track section 5T.

If a train occupies the track section 5T, the track relay 5TR is dropped away. The relay 5HD is then also dropped away because of the open front contacts 78 and 79 of relay 5TR. With the line wires 87 thus deenergized, relay 4HD is dropped away. Assuming the track section 4T is not occupied at this time, the front contacts 88 and 89 of relay 4TR are closed so that energy is applied to line wires 90 and, if track relay 3TR is picked up because of unoccupancy of track section 3T, the relay 3HD is energized. With relay 4HD dropped away, however, the polarity of the energization applied to relay 3HD causes the polar contacts of this relay to be in their left-hand positions.

If track section 2T is also unoccupied, track relay 2TR is picked up. The energization that is then applied to relay 2HD is such, with relay 3HD picked up, that the polar contacts of relay 2HD are in their right-hand position.

In the normal condition with track section 1T unoccupied, the approach relay 2A is picked up. Because of the open back contact 91 of this relay 2A, the circuit to the control winding CW of the inductor at the signal S2 location is open-circuited.

When a train enters the track section 1T, the track relay for this track section which is not shown in Fig. 2 is dropped away so that the line wires 92 are deenergized and relay 2A drops away. Although the opening of front contact 93 of relay 2A opens an energizing circuit for relay 2AP, the fact that track relay 2TR is picked up and that relay 2HD is energized with such a polarity of current that its polar contacts are in their right-hand positions causes an alternate energizing circuit for the relay 2AP to be established. This circuit includes (+), front contact 94 of relay 2TR, front contact 95 of relay 2HD, right-hand contact 96 of relay 2HD, and the winding of relay 2AP to (—). With relay 2AP thus held energized and relay 2A now dropped away, a circuit is completed to energize the control winding CW of the wayside inductor at this location. This circuit extends from (+) and includes the winding of relay 2CK, the variable resistor 97, right-hand contact 98 of relay 2HD, front contact 99 of relay 2HD, front contact 100 of relay 2TR, the control winding CW, front contact 101 of relay 2AP, back contact 91 of relay 2A, and front contact 102 of relay 2HD, to (—). The amount of resistance in this circuit as determined by the position of the variable tap on resistor 97 determines the amplitude of current through the control winding CW and is so selected that the inductor will produce the desired effect upon receiver B but will produce a negligibly small effect upon the current of the secondary winding of receiver A as indicated in Fig. 5. A clearing control is thus received as the train passes the inductor at this signal S2 location.

When the train moves from track section 1T into track section 2T, the track relay 2TR drops away so that line wires 84 become deenergized. Relay 3A then drops away and opens the energizing circuit to relay 3AP at the open front contact 64. Since relay 3HD has its polar contacts in their left-hand positions under the circumstances in which track section 5T is occupied, no alternate energizing circuit for relay 3AP is provided so that relay 3AP is deenergized. Because of the slow release characteristics for relay 3AP as indicated by the heavy base line for the symbol representing this relay, relay 3AP does not immediately drop away.

As soon as relay 3A drops away and closes its back contact 105, an energizing circuit is provided for the control winding of the inductor at this signal S3 location. This circuit extends from (+) and includes the winding of relay 3CK, left-hand contact 106 of relay 3HD, front contact 107 of relay 3HD, front contact 108 of relay 3TR, the control winding CW, front contact 109 of relay 2AP, back contact 105 of relay 3A, and front contact 110 of relay 3HD, to (—). The polarity of energization that is applied to the control winding of this wayside inductor is the same as that applied to the inductor at the signal S2 location. This circuit for the energization of the control winding of the inductor at the S3 signal location does not include any part of the variable resistor 111, however, so that the amplitude of energization of the control winding is substantially increased. Being thus energized, this inductor is effective to provide a limited speed control to passing trains.

Because of the relatively large inductance of the control winding of each wayside inductor, a certain time must elapse from the time that current is first applied to such control winding until this current reaches its final amplitude. Energization of the control winding is begun when the approach relay 3A is dropped away and closes its back contact 105. At the same time, relay 3AP is deenergized at the open front contact 64 of relay 3A. Since relay 3AP does not immediately drop away, however, its front contact 109 remains closed so that the circuit to the control winding CW remains intact. If, during this interval, the level of energization for the control winding reaches the proper value, the relay 3CK will pick up since the pickup level of current for this relay is selected so that it will be actuated when the proper current level is passing through the control winding CW. If relay 3CK does pick up during this time before the relay 3AP would ordinarily drop away, the front contact 112 of relay 3CK closes and applies energy through front contact 113 of relay 3AP to the winding of this relay 3AP. Thus, if relay 3AP has not dropped away by the time relay 3CK picks up, relay 3AP will be held energized. If relay 3AP should drop away, however, because of a too delayed pickup of the relay 3CK, then relay 3AP will drop away and open the energizing circuit for the control winding. In this way, it is assured that if the proper level of energization for the control winding is not maintained during such times that the control winding is supposed to be energized at the higher current level, then relay 3CK drops away and causes relay 3AP to also drop away so that the control winding circuit is opened. Being thus open-circuited, the inductor is then effective to give the most restrictive control to passing trains. Otherwise, if it were erroneously energized at the lower level, a clearing control might falsely be given.

When a wayside inductor is controlled to give a clearing control according to the manner already explained, an alternate circuit is provided to hold the relay 2AP energized. This alternate circuit is provided to hold the energizing circuit for the winding intact at front contact 101 of relay 2AP because this low level of energization is not effective in holding relay 2CK picked up so that a stick circuit is not established for the relay 2AP under these circumstances.

When the train moves from track section 2T into track section 3T, the approach relay 4A drops away and causes the circuit to the control winding of the inductor at this location to be closed. Since the relay 4HD at this location has dropped away because of occupancy of track section 5T, the circuit that is established for the control winding causes the polarity of energization for the winding to be opposite from that applied to the control winding of inductor S3 at the location. Thus, this circuit now extends from (+) and includes the winding of relay 4CK, back contact 120 of relay 4HD, back contact 121 of relay 4A, front contact 122 of relay 4AP, the control winding CW of the wayside inductor, front contact 123 of relay 4TR, and back contact 124 of relay 4HD to (—). With this polarity of inductor energization, an approach speed control becomes effective on the train.

The circuit organization including the relays 4A, 4AP, and 4CK operate under these circumstances in the same manner as previously described in connection with the similar relays at the signal S3 location so that failure of the circuit organization to provide the proper high level of energization for the control winding causes the control winding to become open-circuited.

When the train moves into the track section 4T, there is no effect upon the approach relay 5A because the line wires 87 have previously been deenergized as a result of the dropped away condition of track relay 5TR which caused its front contacts 85 and 86 to be open. Since track relay 5TR is dropped away, its front contact 125 is also open so that the control winding of the inductor at this location is open-circuited. The most restrictive or "stop and proceed" control is thus transferred by this conductor to passing trains.

If a train occupies track section 4T so that relay 5A is dropped away and the train that has been occupying track section 5T moves ahead, then the new traffic conditions existing ahead of the following train may require that the control winding of the inductor at the S5 signal location be energized with the higher current level. For this reason, relay 5AP is held energized through back contact 130 of relay 5TR when this relay is deenergized. When relay 5TR picks up, relay 5AP is deenergized but does not immediately drop away. During this interval, relay 5CK will ordinarily pick up and establish a stick circuit for relay 5AP through front contact 131 of relay 5CK.

Having described an intermittent speed control system for railroads as one specific embodiment of this invention, we desire it to be understood that this form is selected to facilitate in the disclosure of this invention rather than to limit the number of forms it may assume. Also, various modifications, adaptations, and alterations may be applied to the specific form shown to meet the requirements of practice without in any manner departing from the spirit or scope of this invention.

What we claim is:

1. An intermittent inductive train control system comprising, a single wayside inductor at each location where controls are to be transmitted to passing vehicles, means for selectively and alternatively demagnetizing and magnetizing said inductor with different polarities and intensities of direct-current magnetization according to the control to be transmitted to passing vehicles, a pair of receivers on said train adapted to pass in succession through a close inductive coupling relationship with said inductor during train movement and undergoing distinctive flux changes dependent upon the controlled condition of said wayside inductor, and means responsive to said flux changes for imposing respectively different controls on said train.

2. An intermittent inductive train control system wherein any one of a plurality of four different controls is selectively transmitted from the wayside at fixed locations by inductive cooperation between wayside inductors and receivers of train-carried apparatus, each wayside inductor being selectively and alternatively demagnetized and magnetized with different levels and polarities of direct-current magnetization in accordance with the control desired to become effective on passing trains, said train-carried apparatus including two receivers mounted to pass in succession through a close inductive coupling relationship with said inductor during train movement, each of said receivers adapted to selectively undergo a different and distinctive flux change in response to each different condition of said wayside inductor, and circuit means responsive to the distinctive flux changes occurring in said receivers for effecting different controls upon said trains.

3. In an intermittent inductive train control system wherein controlling influences are transferred from the wayside at fixed locations through the inductive cooperation of wayside inductors and receivers of train-carried apparatus, said single wayside inductor at each location being selectively and alternatively demagnetized and magnetized at both high and low levels of direct-current magnetization and with different polarities of magnetization according to the control that is desired to be made effective on passing trains, said train-carried apparatus including two receivers each having a core structure of magnetic material with a winding about said core structure and adapted to pass through a close inductive coupling relationship with said inductor during train movement, the first of said receivers having its core structure magnetized by direct current to thereby cause distinctive voltages to be induced in said winding of said first receiver when said receiver passes an inductor being alternatively demagnetized and magnetized at said higher level of magnetization, said winding of said second receiver having distinctive voltages induced therein as said second receiver passes an inductor magnetized alternatively with said high and said low level of magnetization, circuit means including speed controlling apparatus distinctively responsive to the current variations resulting in said windings of said receivers for effecting different controls with respect to the speed of said train in accordance with the control received from said wayside inductor.

4. In an intermittent inductive train control system wherein a plurality of controls is selectively transmitted from the wayside at fixed locations to passing trains through inductive action taking place between wayside inductors and receivers associated with train-carried apparatus, each of said wayside inductors being selectively and alternatively magnetized with high and low intensities and different polarities of direct-current magnetization and also demagnetized according to the control to become effective on passing trains, said train-carried apparatus including two receivers each having a core structure of magnetizable material and adapted to pass within a close inductive coupling relationship with said inductor during train movement, one of said receivers being adapted to undergo a distinctive flux change as said receiver passes said inductor only when said inductor is magnetized with said higher intensity of magnetization and alternatively demagnetized, the other of said receivers being adapted to undergo a distinctive flux change as said other receiver passes said inductor only when said inductor is magnetized with said low level of magnetization, relay circuit means, means responsive to the distinctive flux changes occurring in said receivers for controlling said relay circuit means to correspondingly different conditions, and speed controlling apparatus governed by said relay circuit means for imposing different prescribed speed limits upon said train in accordance with the control received from said wayside inductor.

5. In an intermittent inductive train control system, a wayside inductor having a core structure of magnetizable material and a control winding alternatively open-circuited and energized with direct current of a relatively low amplitude and with direct current of a higher amplitude in accordance with the control desired to become effective on passing trains, a first train-carried receiver having a normally energized primary winding and also a secondary winding about a magnetizable core structure, a second receiver having a winding about its magnetizable core structure, said receivers adapted to pass in succession through a close inductive coupling relationship with said inductor during train movement, said secondary winding of said first receiver having distinctive current variations occurring therein as said receiver passes an inductor provided that said control winding is either open-circuited or energized with said higher level of direct current, said winding of said second receiver having distinctive current variations occurring therein as said second receiver passes an inductor provided that said control winding is energized with direct current, means including speed controlling apparatus responsive to said distinctive current variations for imposing prescribed limits with respect to the speed of said train according to the control received from said wayside inductor.

6. In an intermittent inductive train control system in which controlling influences are transferred from the wayside at fixed locations through the inductive cooperation of wayside inductors and receivers of train-carried apparatus, said wayside inductor at each of said wayside locations provided with a control winding, circuit means controlled in accordance with the controlling influence desired to become effective on passing trains for selectively open-circuiting said control winding or energizing said control winding with direct current having either a high or low amplitude, train-carried apparatus including two receivers adapted to pass in succession through an inductive coupling relationship with said inductor during train movement, the first of said receivers having a magnetized core structure and a winding about said core structure, the second of said receivers having a non-magnetized core structure with a winding about said core, first circuit means including said winding of said first receiver having the current therein varied distinctively as said receiver passes said inductor provided said control winding of said inductor is either open-circuited or energized with said direct current of said higher amplitude, second circuit means including said winding of said second receiver having the current therein varied distinctively as said second receiver passes said inductor provided said control winding of said inductor is energized with direct current of either the high or low amplitude, circuit means responsive to the distinctive current changes occurring in said first and second circuit means for effecting correspondingly different controls with respect to the speed of said train.

7. An intermittent inductive train control system wherein a plurality of different controls is selectively transmitted from the wayside at fixed locations by inductive cooperation between wayside and train-carried apparatus comprising, said wayside apparatus including an inductor being selectively and alternatively demagnetized and magnetized at both high and low levels of direct-current magnetization and with different polarities of magnetization according to the control desired to be made effective on passing trains, said train-carried apparatus including two receivers each having a core structure of magnetic material and adapted to pass through a close inductive coupling relationship with said inductor during train movement, means associated with one of said receivers comprising a primary winding and energizing means of low impedance for said primary winding to magnetize said core structure of said first receiver, circuit means associated with each receiver and including a winding about the core structure of each receiver having distinctive current variations occurring therein in response to correspondingly distinctive variations in magnetic flux through the core of the associated receiver, said circuit means associated with said first receiver undergoing a distinctive current change therein when said first receiver passes an inductor alternatively magnetized at said higher level and demagnetized, said circuit means associated with said second receiver undergoing a distinctive current change as said second receiver passes said inductor magnetized with said lower level of magnetization, relay circuit means differently responsive to said distinctive current variations occurring in said circuit means associated with said receivers for imposing different controls upon said train.

8. In an intermittent inductive train control system wherein controlling influences are transmitted from fixed wayside locations to passing vehicles by inductive cooperation between wayside inductors and receivers of train-carried apparatus, means for selectively and alternatively demagnetizing said inductor and magnetizing said inductor with different intensities and polarities of direct-current magnetization for transmitting a selected one of a plurality of restrictive and clearing controls, said train-carried apparatus comprising two receivers mounted to pass in succession through a close inductive relationship with said inductor during train movement, the first of said receivers being adapted to undergo distinctive flux changes when passing said inductor provided said inductor is controlled to transfer clearing or restrictive controls, the second of said receivers being adapted to undergo distinctive flux changes when passing said inductor provided said inductor is controlled to transfer only restrictive controls, said receivers mounted to cause said first receiver to pass said inductor before said second receiver passes said inductor during forward movement of said vehicle, timing means initiated into operation when said first receiver undergoes said distinctive flux change and effective at the end of a predetermined interval to impose a clearing influence on said train, said timing means having its timing terminated prior to the end of said interval if said second receiver undergoes said distinctive flux change during said interval, whereby said clearing control becomes effective on said train-carried apparatus only when said inductor is controlled to transmit a clearing influence.

9. In an intermittent inductive train control system in which a plurality of controls is selectively transmitted from the wayside at fixed locations to moving trains through inductive cooperation between wayside inductors and receivers of train-carried apparatus, said wayside apparatus including an inductor having a control winding, circuit means for selectively and alternatively open-circuiting and energizing said control winding with high and low amplitudes and different polarities of direct current, means responsive to the current in said control winding and effective when said control winding is to be energized with said high amplitude of current to open-circuit said control winding when the amplitude of current in said control winding is below a prescribed level, said means being rendered ineffective when said control winding is to be energized with said lower amplitude of current, whereby open-circuiting of said control winding is prevented when said control winding is to be energized with said lower level of current.

References Cited in the file of this patent
UNITED STATES PATENTS

| | | |
|---|---|---|
| 1,624,118 | Schweyer | Apr. 12, 1927 |
| 1,899,642 | Schweyer | Feb. 28, 1933 |
| 2,066,744 | Schweyer | Jan. 5, 1937 |
| 2,067,116 | Brown | Jan. 5, 1937 |
| 2,109,154 | Reichard | Feb. 22, 1938 |
| 2,559,397 | Bushnell | July 3, 1951 |